United States Patent
Prümm

(10) Patent No.: US 10,288,002 B2
(45) Date of Patent: May 14, 2019

(54) LEAN MODE DURING IDLING FOR REDUCTION OF THE NUMBER OF PARTICLES

(71) Applicant: MAN TRUCK & BUS AG, München (DE)

(72) Inventor: Franz Werner Prümm, Koblenz (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 15/169,048

(22) Filed: May 31, 2016

(65) Prior Publication Data

US 2016/0348599 A1    Dec. 1, 2016

(30) Foreign Application Priority Data

Jun. 1, 2015   (DE) ........................ 10 2015 006 976

(51) Int. Cl.
*F02D 41/08* (2006.01)
*F02D 41/14* (2006.01)
(Continued)

(52) U.S. Cl.
CPC .............. *F02D 41/08* (2013.01); *F01N 1/00* (2013.01); *F01N 3/101* (2013.01); *F02D 37/02* (2013.01); *F02D 41/0002* (2013.01); *F02D 41/1441* (2013.01); *F02D 41/1475* (2013.01); *F02P 15/10* (2013.01); *F02D 41/0007* (2013.01);
(Continued)

(58) Field of Classification Search
CPC ...... F02D 37/02; F02D 41/0002; F02D 41/08; F02D 41/0007; F02D 41/1441; F02D 41/1475; F02D 2200/0404; F02D 2200/1015; F02D 2250/08; F02D 2250/22;
(Continued)

(56) References Cited

U.S. PATENT DOCUMENTS 3,092,091 A * 6/1963 Bosley ................ F01M 13/025
                                                            123/574
3,500,806 A * 3/1970 Moeller ................... F02M 1/00
                                                            123/556
(Continued)

FOREIGN PATENT DOCUMENTS

DE          4303332     8/1994
DE         19706126     8/1998
(Continued)

OTHER PUBLICATIONS

Search Report dated Feb. 14, 2017 which issued in the corresponding European Patent Application No. 16001014.6.
(Continued)

*Primary Examiner* — John Kwon
*Assistant Examiner* — Johnny H Hoang
(74) *Attorney, Agent, or Firm* — Cozen O'Connor

(57) ABSTRACT

An operating method for an apparatus, having an internal combustion engine that can be operated in a lean mode and a stoichiometric mode, a crankcase, at least one combustion chamber and preferably a throttle element via which charge air can be fed from a charge air cooler to the combustion chamber internal combustion engine is switched to a lean mode during idling and is operated in the lean mode, with the result that, in particular, the pressure difference between the crankcase and the combustion chamber is reduced.

15 Claims, 1 Drawing Sheet

(51) Int. Cl.
    *F02D 37/02*         (2006.01)
    *F01N 1/00*          (2006.01)
    *F01N 3/10*          (2006.01)
    *F02D 41/00*         (2006.01)
    *F02P 15/10*         (2006.01)
    *F02P 9/00*          (2006.01)
    *F02P 23/04*         (2006.01)

(52) U.S. Cl.
    CPC ............... *F02D 2200/0404* (2013.01); *F02D 2200/1015* (2013.01); *F02D 2250/08* (2013.01); *F02D 2250/22* (2013.01); *F02P 9/002* (2013.01); *F02P 23/04* (2013.01); *Y02T 10/22* (2013.01)

(58) Field of Classification Search
    CPC ... F01N 1/00; F01N 3/101; F02P 9/002; F02P 15/10; F02P 23/04
    USPC ........ 123/406.23, 406.24, 443; 701/103, 104
    See application file for complete search history.

(56) References Cited

U.S. PATENT DOCUMENTS

| | | | |
|---|---|---|---|
| 4,624,229 A * | 11/1986 | Matekunas | F02D 35/023 123/406.41 |
| 5,622,158 A * | 4/1997 | Katoh | F01N 13/12 123/406.44 |
| 5,722,363 A * | 3/1998 | Iida | F02D 41/10 123/305 |
| 5,803,048 A | 9/1998 | Yano et al. | |
| 5,878,711 A * | 3/1999 | Kamura | F02D 31/008 123/295 |
| 5,913,299 A | 6/1999 | Shimizu et al. | |
| 5,947,077 A | 9/1999 | Yonezawa et al. | |
| 5,954,028 A | 9/1999 | Miyashita et al. | |
| 6,044,824 A | 4/2000 | Mamiya et al. | |
| 6,223,716 B1 * | 5/2001 | Kadota | B60T 17/02 123/295 |
| 6,935,105 B1 * | 8/2005 | Page | B01D 53/944 60/298 |
| 2002/0073943 A1 * | 6/2002 | Geyer | F02B 33/04 123/73 B |
| 2003/0029398 A1 * | 2/2003 | Andersson | F02B 25/14 123/73 PP |
| 2003/0047172 A1 * | 3/2003 | Kim | F02D 41/0042 123/698 |
| 2003/0145836 A1 * | 8/2003 | Linna | F02B 1/12 123/501 |
| 2005/0039722 A1 * | 2/2005 | Montgomery | F02B 61/045 123/435 |
| 2008/0104949 A1 * | 5/2008 | Schmeichel | B01D 53/944 60/297 |
| 2010/0089345 A1 * | 4/2010 | Kim | F01M 13/022 123/41.86 |
| 2010/0154388 A1 | 6/2010 | Schumacher et al. | |
| 2010/0206267 A1 | 8/2010 | Glugla et al. | |
| 2011/0100344 A1 | 5/2011 | Katayama et al. | |
| 2011/0226203 A1 * | 9/2011 | Nelander | F02D 13/08 123/90.17 |
| 2012/0090298 A1 * | 4/2012 | Cleeves | F01N 3/005 60/274 |
| 2012/0179355 A1 | 7/2012 | Hino | |
| 2012/0303231 A1 | 11/2012 | Noumura | |
| 2013/0133618 A1 * | 5/2013 | Larsson | F02P 41/065 123/438 |
| 2013/0255652 A1 * | 10/2013 | Radel | F02B 29/00 123/73 A |
| 2014/0196702 A1 | 7/2014 | Gingrich et al. | |
| 2014/0238348 A1 * | 8/2014 | Pursifull | F02M 25/0221 123/434 |
| 2015/0101328 A1 * | 4/2015 | Surnilla | F02D 41/005 60/599 |
| 2015/0114349 A1 * | 4/2015 | Birkigt | F01N 13/00 123/406.21 |
| 2016/0115892 A1 * | 4/2016 | Tanaka | F02P 9/002 123/406.46 |
| 2016/0312686 A1 * | 10/2016 | Christian | F01M 13/04 |

FOREIGN PATENT DOCUMENTS

| | | |
|---|---|---|
| EP | 1 860 304 | 11/2007 |
| EP | 2307691 | 4/2011 |
| JP | 2010-180774 | 8/2010 |
| WO | WO 2009/153653 | 12/2009 |
| WO | WO 2014/184872 | 11/2014 |

OTHER PUBLICATIONS

Search Report dated Nov. 7, 2016 which issued in the corresponding European Patent Application No. 16001014.6.

* cited by examiner

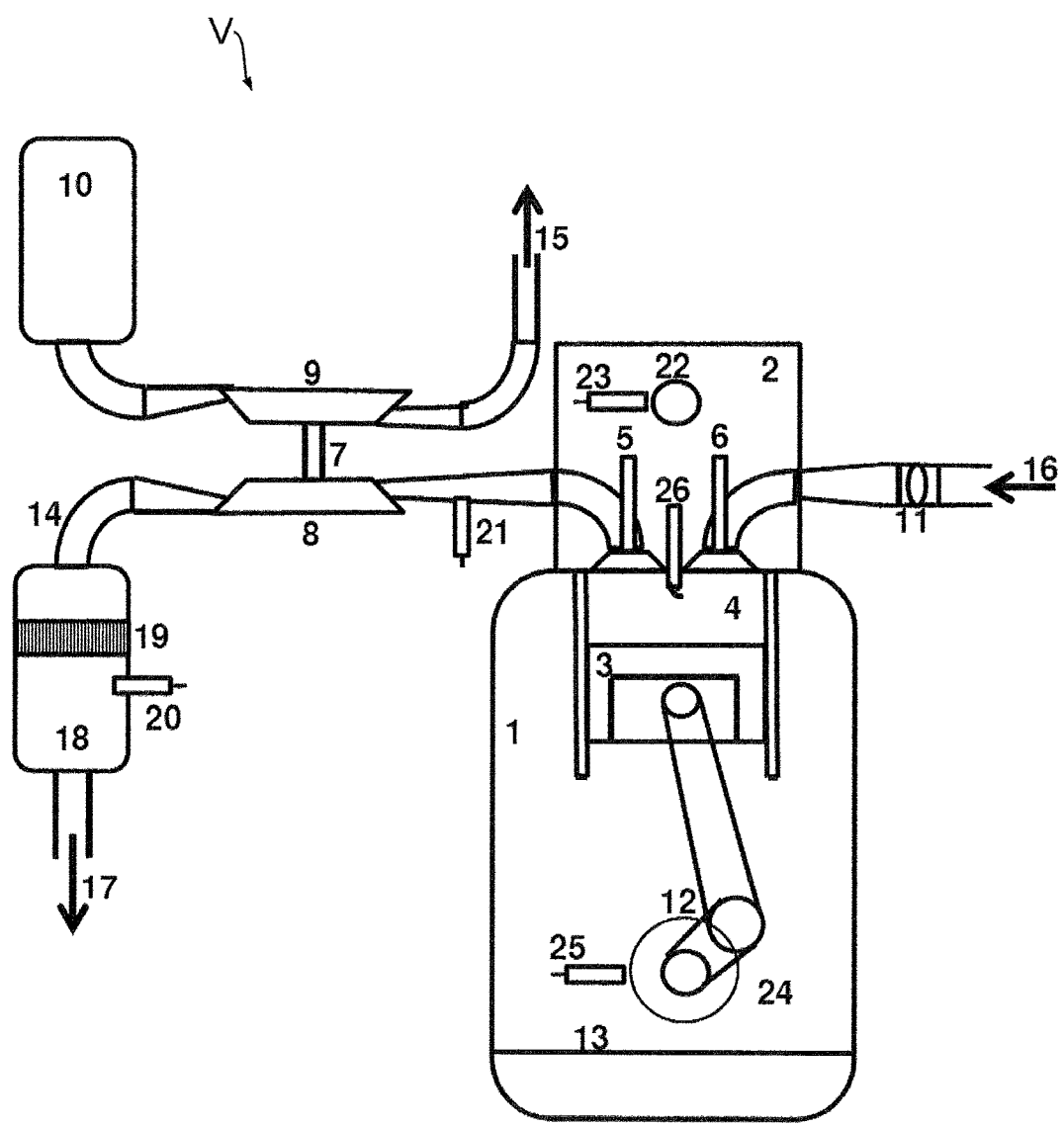

LEAN MODE DURING IDLING FOR REDUCTION OF THE NUMBER OF PARTICLES

BACKGROUND OF THE INVENTION

1. Field of the Invention

The invention relates to an operating method for an apparatus, having an internal combustion engine that can be operated in a lean mode and a stoichiometric mode. In addition a crankcase, at least one combustion chamber and preferably a throttle element, via which charge air can be fed from a charge air cooler to the combustion chamber, are provided.

2. Description of the Related Art

In gas engines, unexpectedly high emissions of fine dust particles occur, which is noticeable in the form of a high particle count in the approval cycle, which is prescribed for EURO VI engines, WHTC (World Harmonized Transient Cycle). The particle emission is not increased over the entire 30-minute cycle but instead is manifest in very high emission peaks, in particular after idling phases.

The mechanism by which it occurs is explained as follows:

Owing to the spark-ignition-engine combustion process, a throttle valve via which charge air can be fed from a charge air cooler to an internal combustion engine is closed during idling, with the exception of a small gap. An underpressure with respect to the surroundings is produced in the intake manifold. During the intake stroke, an underpressure is also produced in the combustion chamber of the engine, for which reason an underpressure with respect to the crankcase of the engine also occurs in the combustion chamber. As a result, air from the crankcase is drawn into the combustion chamber (Reverse-Blow-By). As a result of the movement of air, engine oil is conveyed from the area of the cylinder liner/piston into the combustion chamber. As a result of the low intensity of the combustion during idling, the oil collects in the combustion chamber. If an increase in load takes place after a relatively long idling phase, the collected oil is burnt within a short time period due to the increased flame intensity. High emissions of particles come about as a result of unburnt oil residues (oil ash). This effect is increased because the quantity of oil in the combustion chamber is not taken into account in the metering of fuel. A deficiency of oxygen is present in the combustion chamber, which promotes the emission of particles.

SUMMARY OF THE INVENTION

An object of one aspect of the invention is to provide a possible way of reducing the number of emitted particles.

One aspect of the invention provides an operating method for an apparatus, having an internal combustion engine (for example engine, gas engine, spark-ignition engine, or other internal combustion engine that can be operated with a spark-ignition-engine combustion method) that can be operated in a lean mode and a stoichiometric mode, a crankcase, at least one combustion chamber, and preferably a throttle element, for example a throttle valve, a valve etc., via which charge air is fed from a charge air cooler to the combustion chamber.

The operating method is distinguished, in particular, by virtue of the fact that the internal combustion engine is switched to a lean mode during idling and is operated in the lean mode, with the result that, preferably, an underpressure is generated in the crankcase and/or the pressure difference between the crankcase and the combustion chamber can be reduced.

In internal combustion engines such as, in particular, gas engines, spark-ignition engines or other internal combustion engines, which can be operated with a spark-ignition-engine combustion method, oil collects in the combustion chamber during idling, which leads to high emissions of exhaust gas particles, in particular when a load is connected. To minimize the entry of oil into the combustion chamber, according to one aspect of the invention switching over to lean mode occurs during idling of the internal combustion engine.

The reduced pressure difference between the combustion chamber and the crankcase expediently brings about reduced entry of oil into the combustion chamber and/or a reduced reverse blow-by, resulting in reduced emissions of exhaust gas particles.

As a result of the switching to lean mode during idling, the air demand is increased, in particular increased significantly. Charge air from the charge air cooler can be fed to the combustion chamber, in particular via the throttle element, wherein the throttle element is expediently opened further in the lean mode than in the stoichiometric mode. As a result, the pressure in an intake manifold and/or in the combustion chamber increases.

Engines of the EURO VI emission class have to satisfy the strict exhaust gas regulations of the relevant EU legislation. In the current prior art, compliance with the emission limiting values is usually brought about by stoichiometric operation with lambda=1 in the entire characteristic diagram range, with subsequent exhaust gas post-treatment in a three-way catalytic converter.

As a result of the lean mode during idling, the NOx emission is no longer reduced. To comply with the emission limiting value for NOx, the NOx raw emissions must be very low during idling. As a result of the relatively low combustion temperature in the lean mode, only low emissions of NOx occur during combustion.

The oxidation of CO to form $CO_2$ in, for example, a three-way catalytic converter is brought about in the lean mode even at the low exhaust gas temperature. In contrast, the effectiveness of the oxidation of hydrocarbons HC, in particular of methane ($CH_4$) to form carbon dioxide and water is greatly reduced in the lean mode at the low exhaust gas temperature. Therefore, the raw emissions must also be kept low here.

Compliance with the emission limiting values is possible by one or more of the following measures:

precise adaptive lambda control at the misfire limit, in particular as close as possible to the misfire limit, optimized ignition system for making available the necessary ignition energy, use of modern ignition strategies and/or advanced high-power ignition systems (in particular double ignition during idling, Corona ignition and/or laser ignition), and misfire detection with corresponding measures (for example increasing the ignition energy, adaptation of the ignition strategy and/or enrichment of the fuel-air mixture).

In principle, the unsatisfactory response behaviour of internal combustion engines in the lean mode in the case of positive load changes constitutes a problem. This can be counteracted according to the invention by suitable technical control measures. Thus, in the case of a load request, switching over out of the idling mode directly from the lean mode to a stoichiometric mode can take place. Because a relatively high load is requested, this can expediently take place very quickly with a constant open position of the throttle element. The further increase in the load preferably takes place while maintaining the now stoichiometric mode or, for example, to remove the oxygen that has collected in a silencer, expediently with an excess of fuel, that is to say in the rich mode.

The effectiveness of the lean mode increases with the degree of adjustment in the lean direction, i.e. as lambda increases.

The ignition capability of a fuel-air mixture is, however, limited by a maximum lambda, the misfire limit.

The misfire limit is dependent, inter alia, on the composition of the fuel and is therefore not a constant variable. To operate the engine as close as possible to the misfire limit, a lambda setpoint value can be input as a target value into a characteristic diagram, and when the lean mode is requested the value can be adjusted by the lambda control process in a closed-loop control circuit using the measured values of the lambda probe(s) upstream of a catalytic converter and downstream of the catalytic converter. The ignition energy can be predefined with a not maximum, but expediently high, value. Using, for example, a rotational speed encoder on a camshaft and a rotational speed encoder on a crankshaft, it is preferably monitored whether combustion takes place in all cylinders. For this purpose, the acceleration of the crankshaft in the working stroke can be considered after the ignition of the mixture. If measurable acceleration does not take place in the considered time period, this can be considered to be an ignition misfire. Subsequently, the ignition energy is expediently increased. If the increase in ignition energy remains without effect, the mixture is preferably enriched to a minimum degree, in a way that deviates from the target value in the characteristic diagram in applicable steps, until the engine runs in a stable fashion, i.e. free of misfires. The engine controller can then slowly adjust the mixture again in the direction of the target value until the latter is reached or misfires are detected again. If switching over to lambda=1 operation (stoichiometric operation) occurs, the current lambda setpoint value can be stored, for example, internally in the engine control device. In the case of renewed lean mode, this value is expediently used as a lambda setpoint value (adaptation).

It is therefore possible that in the lean mode lambda control is carried out at the misfire limit, that is to say within the scope of the invention expediently close, preferably as close as possible, to the misfire limit.

It is therefore particularly advantageous if in the lean mode an adaptive lambda control process is carried out at the misfire limit.

It is therefore also possible that a lambda setpoint value is expediently predefined as a target value, for example is input into a characteristic diagram in order to operate the internal combustion engine at the misfire limit a lambda setpoint value is expediently predefined as a target value, for example is input into a characteristic diagram, and preferably when lean mode is requested, said value is adjusted by a lambda control process, for example in a closed-loop control circuit using the measured values of a lambda probe upstream and downstream of a catalytic converter (for example three-way catalytic converter).

The adaptive lambda control process can comprise, in particular, monitoring whether the combustion takes place in (preferably all) cylinders of the internal combustion engine, wherein if measurable acceleration does not take place in the considered time period, this is interpreted as an ignition misfire and the ignition energy can subsequently be increased, wherein if the increase in ignition energy has no effect, the fuel-air mixture is preferably enriched to a minimum degree in a way which deviates from a target value in applicable steps until the engine runs free of misfires and/or the fuel-air mixture can subsequently be adjusted again in the direction of the target value until the latter is reached or at least one misfire is detected again, and/or if switching over to stoichiometric mode occurs the current lambda setpoint value is stored, for example internally in the engine control device, and in the case of renewed lean mode this lambda setpoint value is used as the lambda setpoint value.

It is possible that a higher ignition voltage and/or a longer spark duration than in the stoichiometric mode are/is implemented in the lean mode, in particular lean mode at the misfire limit to initiate the combustion in the combustion chamber.

In the lean mode at the misfire limit, in order to initiate the combustion, a large amount of ignition energy in the form of a high ignition voltage and/or long spark duration of at least one spark plug is required. To make available the necessary ignition energy, it is necessary to optimize the ignition system to the lean mode. Here, in particular one or more of the following measures are possible:

spark plugs configured for lean mode with small electrode spacing.

ignition output stages or ignition output stages integrated into ignition modules suitable for making available a high level of ignition energy.

ignition coils or ignition coils integrated into ignition modules and are able to implement the ignition energy by the spark plug with a long spark duration given a high ignition voltage.

Operation with a high ignition voltage and/or long spark duration causes a high level of wear of the spark plug. Therefore, engine control devices or ignition control devices are necessary that can implement a high level of ignition energy in the lean mode by closing angle characteristic diagrams, which are correspondingly provided with data, but in the stoichiometric mode (lambda=1 mode), make a relatively low level of energy available by switching over to other closing angle characteristic diagrams, in order, as a result, to reduce the wear of the spark plug.

It is therefore possible that in the lean mode, in particular in the lean mode at the misfire limit, one or more spark plug closing angle characteristic diagrams which are different than in the stoichiometric mode are used.

In addition, it is possible that in the lean mode, in particular in the lean mode at the misfire limit, a Corona ignition and/or a laser ignition takes place. It is also possible that in during idling or in the lean mode, a double ignition takes place. As a result, even further shifting in the lean direction beyond the misfire limit of a conventional ignition system can be carried out.

It is possible that in the case of a positive load request to the internal combustion engine, switching over takes place out of the idling mode from the lean mode to a stoichiometric mode, and the switching over from the lean mode to the stoichiometric mode takes place in the case of a preferably constant opening position of the throttle element, in particular in the case of a constant throttle valve angle.

It is preferably possible to switch over out of the idling mode directly from the lean mode to a stoichiometric mode, in particular in the case of a positive load request to the internal combustion engine. A further increase in load can take place, for example, while maintaining a stoichiometric mode or with excess fuel, in particular in order to remove oxygen that has collected in a silencer.

The exhaust gas is preferably fed from the internal combustion engine to an exhaust gas turbocharger and/or an exhaust gas purification system. The exhaust gas purification system preferably comprises a catalytic converter, for example a three-way catalytic converter, expediently with a silencer.

It is also to be noted that as a positive secondary effect of the lean mode during idling, the fuel consumption during idling is reduced, expediently by lower gas cycle losses.

The internal combustion engine preferably comprises an engine, gas engine or another internal combustion engine, expediently for a motor vehicle, preferably for a utility vehicle, in particular a bus or a truck.

The invention also comprises a motor vehicle, in particular utility model, for example a truck or a bus, having a device (for example a control device, engine control device, etc.) which is designed to carry out the operating method as disclosed herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The embodiments and features of the invention described above can be combined with one another. Other advantageous developments of the invention are disclosed in the dependent claims or result from the following description of preferred embodiments of the invention in conjunction with the appended FIGURE.

The FIGURE is an apparatus at or with which an operating method according to an aspect of the invention can be carried out.

DETAILED DESCRIPTION OF THE PRESENTLY PREFERRED EMBODIMENTS

The FIGURE shows an apparatus V at or with which an operating method according to an embodiment of the invention can be carried out. The apparatus V is suitable, in particular, for a motor vehicle, preferably a utility vehicle, in particular a bus or a truck.

The apparatus V comprises, in conjunction with an internal combustion engine, for example a gas engine or another internal combustion engine, which can be expediently operated with a spark-ignition combustion method, a crankcase 1, at least one combustion chamber 4 and preferably a throttle element 11, for example a throttle valve, via which charge air can be fed from a charge air cooler to the combustion chamber 4. The internal combustion engine can be operated, in particular, in a lean mode (lambda greater than 1) and a stoichiometric mode (lambda=1). Lambda characterizes, as is customary, the combustion air ratio, which indicates the mass ratio of air and fuel in a combustion process.

The apparatus V, in particular the crankcase 1, also comprises a cylinder head 2, an outlet valve 5, an inlet valve 6, one or more spark plugs 26, a piston 3 and a crank drive 12.

The apparatus V also has an exhaust gas turbocharger 7 with a turbine 8 and a compressor 9. The reference symbol 10 represents an air filter upstream of the compressor 9.

The apparatus V furthermore comprises an exhaust gas purification system 18, in particular with a three-way catalytic converter 19 and a silencer. The reference symbol 17 represents the exhaust gas outlet from the exhaust gas purification system 18, while the reference symbol 14 represents an exhaust gas entry into the exhaust gas purification system 18.

The apparatus V comprises a lambda probe 20 downstream of the catalytic converter 19, and a lambda probe 21 upstream of the catalytic converter 19.

Reference symbol 15 represents charge air to the charge air cooler, while reference symbol 16 represents charge air from the charge air cooler. The charge air 16 from the charge air cooler is expediently fed via the throttle element 11 into the combustion chamber 4, in particular to the inlet valve 6 or a charge air manifold.

Reference symbol 13 represents an oil level in the crankcase 1.

The apparatus V also comprises a camshaft 22, a rotational speed encoder 23 for the camshaft 22, a crankshaft 24 and a rotational speed encoder 25 for the crankshaft 24.

The internal combustion engine is switched to a lean mode during idling and is operated in the lean mode, with the result that the pressure difference between the crankcase 1 and the combustion chamber 4 is expediently reduced. The reduced pressure difference between the combustion chamber 4 and the crankcase 1 brings about reduced entry of oil into the combustion chamber 4, resulting in reduced emissions of particles.

As a result of the switching to lean mode during idling, the air demand is significantly increased. The throttle element 11 is opened further than in the customary stoichiometric mode, with the result that the pressure in the intake manifold or in the combustion chamber 4 rises.

Engines of the EURO VI emission class have to satisfy the strict exhaust gas regulations of the relevant EU legislation. In the current prior art, compliance with the emission limiting values is brought about by means of stoichiometric operation with lambda=1 in the entire characteristic diagram range, with subsequent exhaust gas post-treatment in a three-way catalytic converter.

As a result of the lean mode during idling, the NOx emission is no longer reduced. In order to comply with the emission limiting value for NOx, the NOx raw emissions should be very low during idling. As a result of the relatively low combustion temperature in the lean mode, only low emissions of NOx occur during combustion.

The oxidation of CO to form $CO_2$ in the three-way catalytic converter 19 is brought about even at the low exhaust gas temperature in the lean mode. In contrast, the effectiveness of the oxidation of hydrocarbons HC, in particular of methane ($CH_4$) to form carbon dioxide and water at the low exhaust gas temperature in the lean mode is greatly reduced. Therefore, the raw emissions should also be kept low here. Compliance with the emission limiting values is possible by the following measures: precise, adaptive lambda control near to the misfire limit, optimized ignition system for making available the necessary ignition energy, use of modern ignition strategies and/or advanced high-power ignition systems (double ignition in LL, Corona ignition, laser ignition), and/or misfire detection with corresponding measures (increase in ignition energy, adaptation of ignition strategy, enrichment of mixture).

The effectiveness of the lean mode increases with the degree of adjustment in the lean direction, that is to say as lambda increases.

The misfire limit or a maximum lambda limits the ignition capability of the fuel-air mixture.

The misfire limit is dependent, inter alia, on the composition of the fuel and is therefore not a constant variable. To operate the internal combustion engine as close as possible to the misfire limit, a lambda setpoint value is input as a target value into a characteristic diagram, and when a lean mode is requested it is expediently adjusted by the lambda control system in a closed-loop control circuit using measured values of the lambda probe 21 upstream of the catalytic converter 19 and the lambda probe 20 downstream of the catalytic converter 19. The ignition energy for igniting the fuel-air mixture is predefined with an expediently high, but not maximum, setpoint value. Using, in particular, the rotational speed encoder on a camshaft 23 and rotational speed encoder on a crankshaft 25 it is possible to monitor whether the combustion takes place in (all) cylinders of the internal combustion engine. For this purpose, it is possible, in particular, to consider the acceleration of the crankshaft 24 in the working stroke after the ignition of the fuel-air mixture. If no measurable acceleration takes place in the considered time period, this can be considered to be an ignition misfire. Subsequently, the ignition energy can be increased. However, if the increase in the ignition energy has no effect, the fuel-air mixture can expediently be enriched to a minimum degree, deviating from the setpoint value in the characteristic diagram in preferably applicable steps, until the internal combustion engine runs in a stable fashion, in particular without misfires. Subsequently, the fuel-air mixture can be set again in the direction of the setpoint value until this setpoint value is reached or one or more misfires are detected again. If switching over to the stoichiometric mode, that is to say lambda=1 occurs, the current lambda setpoint value can be stored, for example, internally in an engine control device for controlling the internal combustion engine. Given a renewed lean mode, this setpoint value can be used as, as it were, a new lambda setpoint value. As a result adaptation takes place.

Given a lean mode at the misfire limit, a high level of ignition energy in the form of a high ignition voltage and/or long spark duration is required to initiate the combustion. In order to make available the necessary ignition energy, it is necessary to optimize or adapt conventional ignition systems. Possible measures are, in particular: spark plugs which are configured for lean mode with an expediently small electrode spacing, ignition output stages or ignition output stages which are integrated into ignition modules and which are suitable for making available an expediently high level of ignition energy, ignition coils or ignition coils integrated into ignition modules and which, given an expediently high ignition voltage, are capable of converting the ignition energy by the spark plug with an expediently long spark duration, and/or engine control devices and/or ignition control devices which can expediently implement a high level of ignition energy in the lean mode by closing angle characteristic diagrams which are correspondingly provided with data, while on the other hand they can make available a relatively low level of ignition energy in the stoichiometric mode by switching to other closing angle characteristic diagrams, in order, as a result, to be able to reduce, in particular, the wear of the spark plug.

Ignition concepts which are suitable for the lean mode are, for example, Corona ignition and/or laser ignition. If such ignition systems are available for series use, they offer a high potential with respect to further shifting in the lean direction beyond the misfire limit of a conventional ignition system.

A further problem is the poor response behaviour of engines in the lean mode in the case of positive load changes. This can be counteracted by the operating method by suitable technical control measures. Thus, in the case of a load request, switching over out of the idling mode directly from the lean mode to a stoichiometric mode can take place. Because a relatively high load is requested, this can expediently take place very quickly with a constant open position of the throttle element 11. The further increase in the load preferably takes place while maintaining the now stoichiometric mode or, for example, in order to remove the oxygen which has collected in the silencer, expediently with an excess of fuel, that is to say in the rich mode.

The invention is not limited to the preferred embodiments described above. Instead, a multiplicity of variants and refinements, which also make use of the inventive concept and therefore fall within the scope of protection are possible. Furthermore, the invention also claims protection for the subject matter and the features of the dependent claims, independently of the features and claims referred to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for an internal combustion gas engine configured to be operated in a lean mode and a stoichiometric mode and having a crankcase, at least one combustion chamber, comprising:
   switching the internal combustion engine to a lean mode during idling mode;
   operating the internal combustion engine in the lean mode such that a pressure difference between the crankcase and the at least one combustion chamber is reduced, wherein at least one of:
   lambda control is carried out at a misfire limit, and
   the lean mode is carried out at the misfire limit; and
   feeding exhaust gas from the internal combustion engine to at least one of an exhaust gas turbocharger and an exhaust gas purification system,
   wherein the exhaust gas purification system comprises a three-way catalytic converter.

2. The operating method according to claim 1, further comprising:
   feeding charge air from a charge air cooler to the at least one combustion chamber via a throttle element; and
   opening the throttle element further in the lean mode than in the stoichiometric mode.

3. The operating method according to claim 1, wherein the lambda control is an adaptive lambda control process carried out at the misfire limit.

4. The operating method according to claim 1, wherein a lambda setpoint value is predefined as a target value to operate the internal combustion engine at the misfire limit, and when lean mode is requested, the lambda setpoint value is adjusted by the lambda control in a closed-loop control circuit using measured values of lambda probes arranged upstream and downstream of a catalytic converter, respectively.

5. The operating method according to claim 1, wherein a current lambda setpoint value is expediently stored in an engine control device for controlling the internal combustion engine if switching over from the lean mode to the stoichiometric mode occurs, and in a case of a renewed lean mode, the previously stored current lambda setpoint value is used as a new lambda setpoint value.

6. The operating method according to claim 3, wherein the adaptive lambda control process comprises:
    monitoring whether combustion takes place in respective cylinders of the internal combustion engine, for which purpose acceleration of a crankshaft in a working stroke is considered after an ignition of an fuel-air mixture;
    increasing an ignition energy for igniting the fuel-air mixture is increased if a measurable acceleration does not take place in a considered time period;
    enriching the fuel-air mixture is enriched in a way that deviates from a lambda target value until the internal combustion engine runs free of misfires if the increase in the ignition energy has no effect; and
    subsequently adjusting the fuel-air mixture in a direction of the lambda target value until one of:
        the lambda target value is reached, or
        at least one misfire is detected.

7. The operating method according to claim 1, wherein at least one of a higher ignition voltage and a longer spark duration than in the stoichiometric mode is implemented in the lean mode to initiate combustion in the at least one combustion chamber.

8. The operating method according to claim 1, wherein in the lean mode one or more spark plug closing angle characteristic diagrams, which are different than in the stoichiometric mode, are used.

9. The operating method according to claim 1, wherein in the lean mode at least one of a double ignition, a Corona ignition and a laser ignition takes place.

10. The operating method according to claim 1, further comprising:
    switching out of the idling mode from the lean mode to a stoichiometric mode in case of a positive load request to the internal combustion engine; and
    switching from the lean mode to the stoichiometric mode takes place in a case of a constant opening position of a throttle element.

11. The operating method according to claim 10, wherein in a case of a positive load request to the internal combustion engine, switching over takes place out of the idling mode directly from the lean mode to a stoichiometric mode.

12. The operating method according to claim 11, wherein a further increase in load takes place at least one of:
    while maintaining a stoichiometric mode and
    with excess fuel.

13. The operating method according to claim 1, wherein the exhaust gas purification system further comprises a silencer.

14. A motor vehicle, comprising:
    an internal combustion gas engine configured to be operated in a lean mode and a stoichiometric mode and having a crankcase and at least one combustion chamber;
    a control device configured to:
    switch the internal combustion engine to a lean mode during idling;
    operate the internal combustion engine in the lean mode such that a pressure difference between the crankcase and the at least one combustion chamber is reduced, wherein at least one of lambda control is carried out at a misfire limit and the lean mode is carried out at the misfire limit; and
    feed exhaust gas from the internal combustion engine to at least one of an exhaust gas turbocharger and an exhaust gas purification system,
    wherein the exhaust gas purification system comprises a three-way catalytic converter.

15. The motor vehicle according to claim 14, wherein the internal combustion engine includes a throttle element via which charge air can be fed from a charge air cooler to the at least one combustion chamber.

* * * * *